(12) United States Patent
Lai et al.

(10) Patent No.: US 7,234,834 B2
(45) Date of Patent: Jun. 26, 2007

(54) BACKLIGHT MODULE AND LIQUID CRYSTAL DISPLAY INCORPORATING SAME

(75) Inventors: Ching-Kun Lai, Dacun Township, Changhua County (TW); Hann-Chou Liu, Hsinchu (TW)

(73) Assignee: AU Optronics Corp., Hsin-Chu (TW)

( * ) Notice: Subject to any disclaimer, the term of this patent is extended or adjusted under 35 U.S.C. 154(b) by 21 days.

(21) Appl. No.: 11/200,138

(22) Filed: Aug. 10, 2005

(65) Prior Publication Data

US 2006/0203479 A1    Sep. 14, 2006

(30) Foreign Application Priority Data

Mar. 11, 2005   (TW) .............................. 94107565 A

(51) Int. Cl.
*F21V 29/00*   (2006.01)
(52) U.S. Cl. .................. 362/218; 362/225; 362/373
(58) Field of Classification Search ............... 362/218, 362/219, 222, 223, 224, 225, 297, 373
See application file for complete search history.

(56) References Cited

U.S. PATENT DOCUMENTS

| 7,059,757 B2 * | 6/2006 | Shimizu ............... 362/561 |
| 2004/0228110 A1 | 11/2004 | Hsieh et al. |
| 2005/0057946 A1 * | 3/2005 | Kim .................... 362/561 |

FOREIGN PATENT DOCUMENTS

| CN | 1547065 | 11/2004 |
| CN | 1584690 | 2/2005 |
| TW | M253788 | 12/2004 |

* cited by examiner

Primary Examiner—Laura K. Tso
(74) Attorney, Agent, or Firm—Rabin & Berdo PC

(57) ABSTRACT

A backlight module includes a bezel, a light source, a reflector, a diffuser and a heat dissipation channel. The bezel includes a bottom plate, a top plate disposed above and in parallel with the bottom plate, and an inclined lateral plate for connecting the bottom plate and the top plate. The light source is disposed over the bottom plate. The reflector is disposed under the light source and attached on the bottom plate and the inclined lateral plate. The diffuser is disposed on one part of the top plate and is positioned above the light source. In addition, the heat dissipation channel is formed between the diffuser and the top plate.

12 Claims, 2 Drawing Sheets

BACKLIGHT MODULE AND LIQUID CRYSTAL DISPLAY INCORPORATING SAME

This application claims the benefit of Taiwan application Serial No. 94107565, filed Mar. 11, 2005, the subject matter of which is incorporated herein by reference.

BACKGROUND OF THE INVENTION

1. Field of the Invention

The invention relates in general to a backlight module and a liquid crystal display (LCD) formed therefrom, and more particularly to a backlight module having a heat dissipation channel formed between a diffuser and a top plate of a bezel.

2. Description of the Related Art

Because of the rapid advance of the technology of manufacturing the liquid crystal display (LCD) and the LCD has the advantages of light, thin, power-saving and radiationless properties, the LCDs are widely used in various electrical products, such as personal digital assistants (PDAs), notebook computers, digital cameras, digital camcorders, mobile telephones, computer monitors and liquid crystal televisions. However, because the LCD panel in the LCD is a display panel that cannot emit light itself, a backlight module is needed to provide light so that the display function can be achieved. The conventional backlight module includes a bezel, a reflector, several cold cathode fluorescent lamps (CCFLs), a diffuser and an optical film set. The bezel includes a bottom plate, a top plate and an inclined lateral plate for connecting the bottom plate to the top plate. The bottom plate, the top plate and the inclined lateral plate define a downward concave space. The reflector is positioned above the downward concave space and attached on the bottom plate of the bezel and one part of the inclined lateral plate. The CCFL for providing light is positioned in the downward concave space and disposed above the reflector. The diffuser is disposed on the bezel and positioned above the CCFL. The optical film set is disposed above the diffuser. In addition, the edge of the diffuser usually contacts one part of the top plate to seal the opening of the downward concave space.

However, the CCFL generates heat to cause high temperature while emitting light. Because the edge of the diffuser contacts one part of the top plate to seal the opening of the downward concave space, the heat generated by the CCFL in the downward concave space cannot be dissipated to the outside. More particularly, as the required brightness of the LCD is gradually increasing, the increased brightness of the CCFL inevitably generates more heat, and the internal environmental temperature of the LCD is thus increased. Consequently, the working environmental temperature of the CCFL is increased a lot, thereby deteriorating the light emitting quality of the CCFL and thus greatly influencing the operating quality of the backlight module. Similarly, the backlight module using light emitting diodes (LEDs) to provide light also encounters the above-mentioned problems.

SUMMARY OF THE INVENTION

It is therefore an object of the invention to provide a backlight module having a heat dissipation channel formed between a diffuser and a top plate of a bezel, such that the internal heat of the backlight module may be quickly dissipated to the outside. Thus, it is possible to prevent the internal temperature of the backlight module from rising too high and thus influencing the light emitting efficiency of the light source, and the operation quality of the backlight module may be greatly enhanced.

The invention achieves the above-identified object by providing a backlight module, which includes a bezel, a light source, a reflector, a diffuser and a heat dissipation channel. The bezel includes a bottom plate, a top plate, and a lateral plate for connecting the bottom plate and the top plate. The light source is disposed over the bottom plate. The reflector is disposed under the light source and attached on the bottom plate and the lateral plate. The diffuser is disposed on one part of the top plate and positioned above the light source. The heat dissipation channel is formed between the diffuser and the top plate.

According to another object of the invention, a liquid crystal display (LCD) is provided. The LCD includes a backlight module and a LCD panel. The backlight module includes a bezel, a light source, a reflector, a diffuser and a heat dissipation channel. The bezel includes a bottom plate, a top plate, and a lateral plate for connecting the bottom plate and the top plate. The light source is disposed over the bottom plate. The reflector is disposed under the light source and attached on the bottom plate and the lateral plate. The diffuser is disposed on one part of the top plate and positioned above the light source. The heat dissipation channel is formed between the diffuser and the top plate. The LCD panel is disposed above the backlight module.

In one embodiment of the invention, the heat dissipation channel may be formed in the diffuser or the top plate.

Other objects, features, and advantages of the invention will become apparent from the following detailed description of-the preferred but non-limiting embodiments. The following description is made with reference to the accompanying drawings.

DETAILED DESCRIPTION OF THE INVENTION

In order to solve the problem of heat dissipation of the backlight module, the invention provides a backlight module including a bezel, a light source, a reflector, a diffuser and a heat dissipation channel. The bezel includes a bottom plate, a top plate in parallel with the bottom plate and an inclined lateral plate for connecting the bottom plate and the top plate. The bottom plate, the inclined lateral plate and the top plate define and form a downward concave space. The light source is disposed inside the downward concave space and provides light. In other word, the light source is disposed over the bottom plate. The reflector is disposed under the light source and attached on the bottom plate and the inclined lateral plate. The diffuser is disposed on one part of the top plate and positioned above the light source. In addition, the heat dissipation channel is formed between the diffuser and the top plate. Consequently, the internal heat of the backlight module can be quickly dissipated to the outside through the heat dissipation channel so as to prevent the internal temperature of the backlight module from raising too high and influence the light-emitting efficiency of the light source, and to greatly enhance the operation quality of the backlight module. The formations and suitable positions of the heat dissipation channel will be described with reference to the accompanying drawings according to the first and second embodiments.

First Embodiment

Figure 1A:
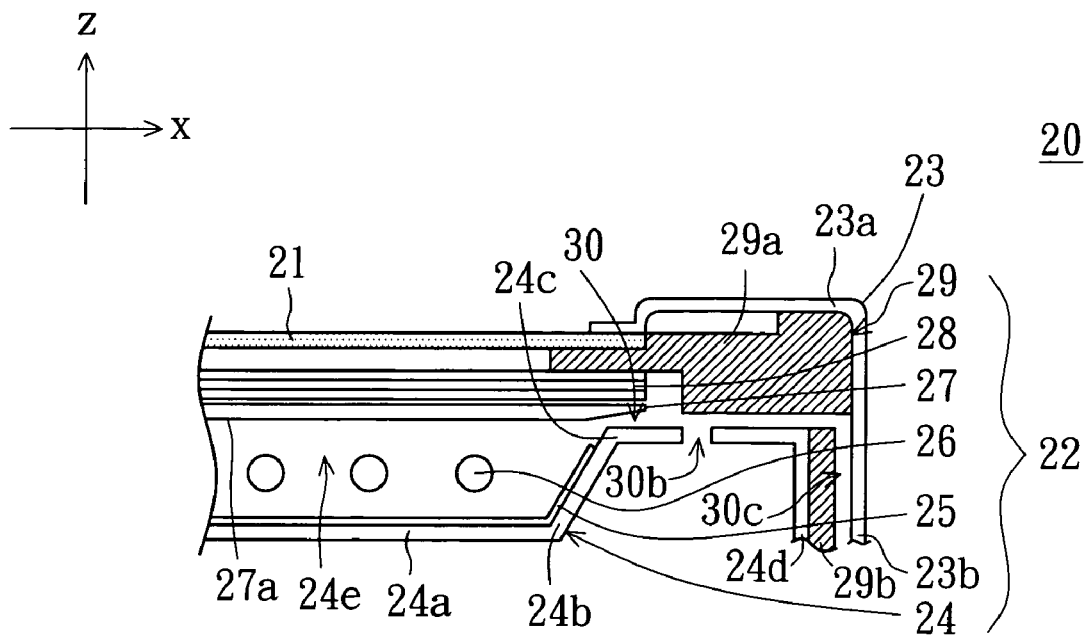
FIG. 1A is a partially cross-sectional view showing an LCD according to a first embodiment of the invention.

FIG. 1A is a partially cross-sectional view showing an LCD according to a first embodiment of the invention. Referring to FIG. 1A, the LCD 20 includes an LCD panel 21, a backlight module 22 and an external frame 23. The backlight module 22 includes a bezel 24, a reflector 25, at least one light source 26, a diffuser 27, an optical film set 28 and a plastic frame 29. The bezel 24 has a bottom plate 24a, a top plate 24c in parallel with the bottom plate 24a, and an inclined lateral plate 24b for connecting the bottom plate 24a and the top plate 24c. The bottom plate 24a, the inclined lateral plate 24b and the top plate 24c define and form a downward concave space 24e. A light source 26 is disposed inside the downward concave space 24e to provide light. In other word, the light source 26 is disposed over the bottom plate 24a. The light source 26 is a cold cathode fluorescent lamp (CCFL) or a light emitting diode (LED), and the CCFL will be described as an example. The reflector 25 is disposed under the light source 26 and attached on the bottom plate 24a and the inclined lateral plate 24b. The diffuser 27 is disposed on one part of the top plate 24c and positioned above the light source 26. In addition, a heat dissipation channel 30 is formed between the diffuser 27 and the top plate 24c. The optical film set 28 is disposed above the diffuser 27. The optical film 28 includes a diffuser piece and a prism piece. The reflector 25, the light source 26, the diffuser 27 and the optical film set 28 can be interposed between the bezel 24 and the plastic frame 29 after the bezel 24 is attached to the plastic frame 29. The LCD panel 21 is disposed above the backlight module 22.

Figure 1B:
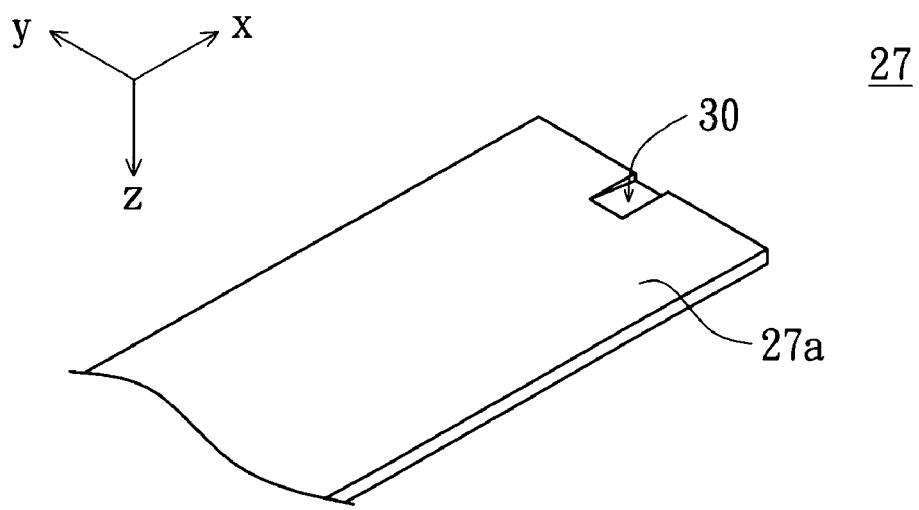
FIG. 1B is a pictorially enlarged bottom view showing one part of a diffuser of FIG. 1A having a heat dissipation channel.

In this embodiment, the heat dissipation channel 30 is formed in the diffuser 27. FIG. 1B is a pictorially enlarged bottom view showing one part of a diffuser of FIG. 1A having a heat dissipation channel. As shown in FIG. 1B, the diffuser 27 has a diffuser surface 27a facing the top plate 24c. The edge of the diffuser surface 27a contacts the surface of one part of the top plate 24c. Consequently, the heat dissipation channel 30 like a notch is formed at the edge of the diffuser surface 27a. However, the method of forming the heat dissipation channel 30 in the diffuser 27 is not limited thereto, and the heat dissipation channel 30 of the diffuser 27 may be used as long as the diffuser surface 27a has a concave structure or a convex structure.

In addition, the LCD panel 21 can be interposed between the plastic frame 29 and the external frame 23 through the combination of the plastic frame 29 and the external frame 23, such that the LCD panel 21 is disposed above the optical film set 28. The backlight module 22 and the LCD panel 21 are combined together.

In order to enhance the heat dissipation convention effect of the backlight module 22, the backlight module 22 further has a through hole 30b, which is formed in the top plate 24c and in communication with the heat dissipation channel 30. In addition, after the plastic frame 29 is combined with the bezel 24, an external through hole 30c in communication with the heat dissipation channel 30 is formed between the plastic frame 29 and the bezel 24, such that the internal heat of the backlight module 22 can be quickly dissipated to the outside through the heat dissipation channel 30 and the external through hole 30c.

In this embodiment, the bezel 24 further has an external lateral plate 24d, which is connected to the top plate 24c and extends downwards. The plastic frame 29 has a plastic frame top plate 29a and a plastic frame lateral plate 29b. The external frame 23 has an external frame top plate 23a and an external frame lateral plate 23b. The plastic frame top plate 29a is positioned between the external frame top plate 23a, the top plate 24c and the top portion of the external frame lateral plate 23b. The plastic frame lateral plate 29b is attached on the external lateral plate 24d and defines an interval with a bottom portion of the external frame lateral plate 23b. Consequently, the external through hole 30c can be formed between the plastic frame top plate 29a and the top plate 24c and the plastic frame lateral plate 29b and the bottom portion of the external frame lateral plate. However, the method of forming the external through hole 30c between the plastic frame 29, the external frame 23 and the bezel 24 is not limited thereto. Any external through hole, which can communicate the heat dissipation channel 30 with the outside, can be used.

Although the plastic frame top plate 29a and the plastic frame lateral plate 29b in the cross-sectional view of FIG. 1A look like a discontinuous structure, the plastic frame top plate 29a and the plastic frame lateral plate 29b may be formed into a one-piece molded structure. It is to be noted that the connection portion between the plastic frame top plate 29a and the plastic frame lateral plate 29b cannot be shown in the cross-sectional view of FIG. 1A.

The configuration of the heat dissipation channel formed between the diffuser and the top plate of the bezel in this embodiment enables the internal heat of the backlight module to be quickly dissipated to the outside. Thus, it is possible to prevent the internal temperature of the backlight module from rising too high and influencing the light-emitting efficiency of the light source, and the operation quality of the backlight module can be greatly enhanced.

Second Embodiment

Figure 2A:
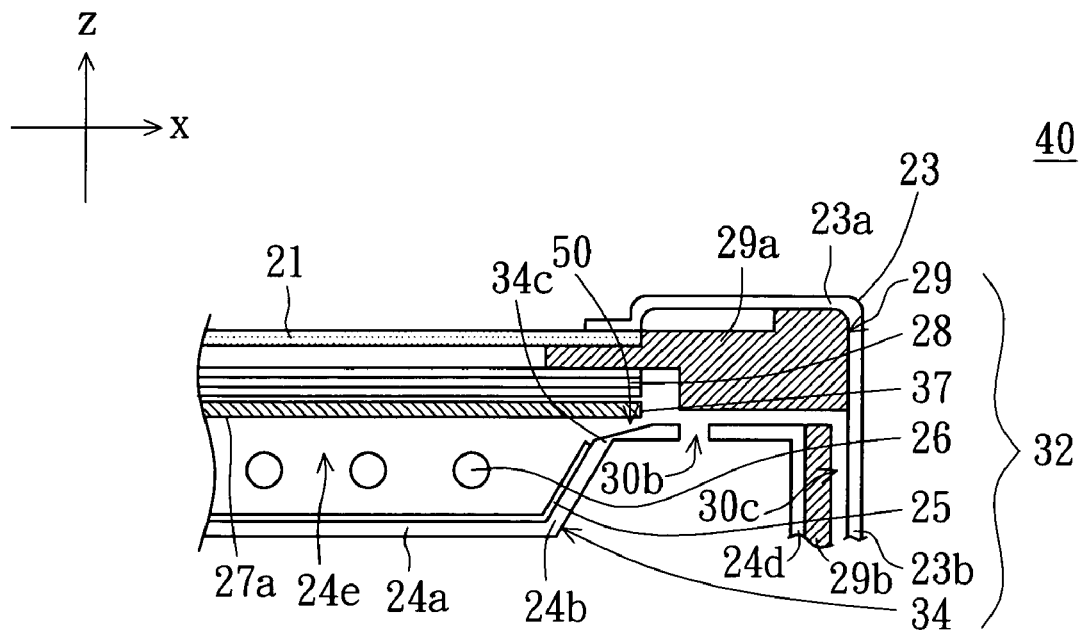
FIG. 2A is a partially cross-sectional view showing an LCD according to a second embodiment of the invention.

FIG. 2A is a partially cross-sectional view showing an LCD according to a second embodiment of the invention. The LCD 40 of this embodiment is different from the LCD 20 of the first embodiment in the backlight module 32, which has a diffuser 37, a bezel 34 and a heat dissipation channel 50 different from those of the backlight module 22 of the first embodiment. Other components, which are the same as those of the first embodiment, have the same symbols as the first embodiment, and detailed descriptions thereof will be omitted.

As shown in FIG. 2A, the heat dissipation channel 50 is formed between the diffuser 37 and the top plate 34c of the bezel 34. In this embodiment, the heat dissipation channel 50 is formed in the top plate 34c. So, the diffuser 37 does not need the heat dissipation channel 30 similar to the notch of the first embodiment.

Figure 2B:
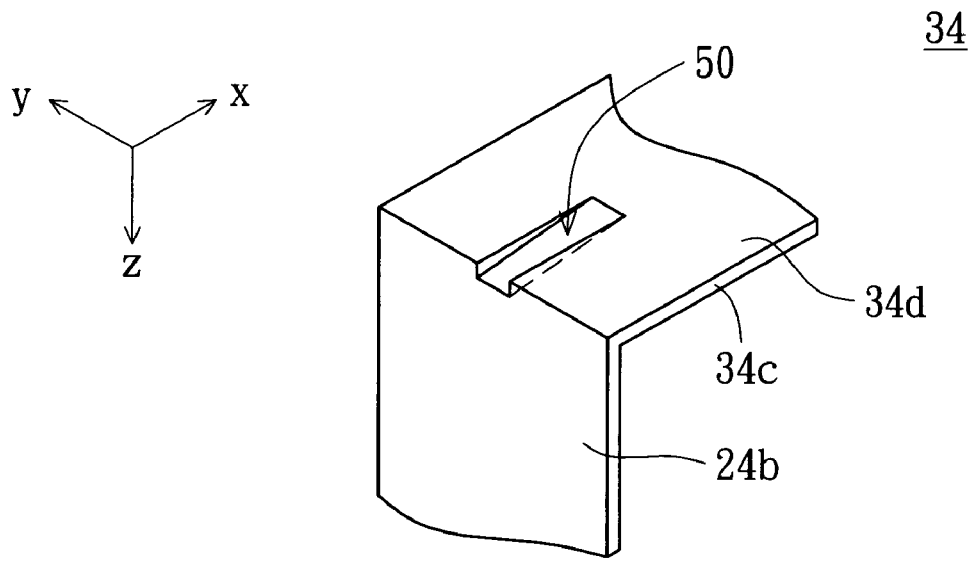
FIG. 2B is a pictorially enlarged top view showing one part of a bezel of FIG. 2A having a heat dissipation channel.

FIG. 2B is a pictorially enlarged top view showing one part of a bezel of FIG. 2A having a heat dissipation channel. As shown in FIG. 2B, the top plate 34c has a top plate surface 34d to be in contact with an edge of a surface of the diffuser 37. The top plate surface 34d has a heat dissipation channel 50 like a notch. However, the method of forming the heat dissipation channel 50 above the top plate 34c is not limited thereto, and the heat dissipation channel 50 of the top plate 34c may be used as long as the top plate surface 34d has a concave structure or a convex structure.

One of ordinary skill in the art may easily understand that the technology of this embodiment is not limited thereto, For example, the diffuser may have at least one first notch, the top plate of the bezel has at least one second notch, and the first notch and the second notch form at least one heat dissipation channel when the diffuser is disposed on one part of the top plate. The first notch and the second notch may correspondingly form a heat dissipation channel, or the first notch and the second notch may be arranged alternatively to form two heat dissipation channels.

The backlight module according to the embodiments of the invention has the heat dissipation channel formed between the diffuser and the top plate of the bezel. So, the internal heat of the backlight module may be quickly dissipated to the outside. It is possible to prevent the internal temperature of the backlight module from rising too high and thus influencing the light-emitting efficiency of the light source, and the operation quality of the backlight module may be greatly enhanced.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A backlight module, comprising:
   a bezel having a bottom plate, a top plate, and a lateral plate for connecting the bottom plate and the top plate;
   a light source disposed over the bottom plate;
   a reflector disposed under the light source and attached on the bottom plate and the lateral plate;
   a diffuser disposed on one part of the top plate and positioned above the light source; and
   a heat dissipation channel formed between the diffuser and the top plate, wherein the heat dissipation channel is formed in the diffuser.

2. The backlight module according to claim 1, wherein the heat dissipation channel is formed in the top plate.

3. The backlight module according to claim 1, further comprising a through hole formed in the top plate.

4. The backlight module according to claim 1, further comprising a frame attached to the top plate, wherein an external through hole communicating with the heat dissipation channel is formed between the frame and the bezel.

5. The backlight module according to claim 4, wherein the frame is a plastic frame.

6. The backlight module according to claim 1, wherein the light source is a cold cathode fluorescent lamp (CCFL) or a light emitting diode (LED).

7. A liquid crystal display (LCD) comprising
   a backlight module, comprising:
   a bezel having a bottom plate, a top plate, and a lateral plate for connecting the bottom plate and the top plate;
   a light source disposed over the bottom plate;
   a reflector disposed under the light source and attached on the bottom plate and the lateral plate;
   a diffuser disposed on one part of the top plate and positioned above the light source; and
   a heat dissipation channel formed between the diffuser and the top plate, wherein the heat dissipation channel is formed in the diffuser; and
   a liquid crystal display (LCD) panel disposed above the backlight module.

8. The LCD according to claim 7, wherein the heat dissipation channel is formed in the top plate.

9. The LCD according to claim 7, further comprising a through hole formed in the top plate.

10. The LCD according to claim 7, further comprising a frame attached to the top plate, wherein an external through hole communicating with the heat dissipation channel is formed between the frame and the bezel.

11. The LCD according to claim 10, wherein the frame is a plastic frame.

12. The LCD according to claim 7, wherein the light source is a cold cathode fluorescent lamp (CCFL) or a light emitting diode (LED).

* * * * *